(12) United States Patent
Koenen et al.

(10) Patent No.: US 11,710,981 B2
(45) Date of Patent: Jul. 25, 2023

(54) VEHICLE FOR TRANSPORTING AND CHARGING OUTDOOR POWER EQUIPMENT

(71) Applicant: Briggs & Stratton, LLC, Wauwatosa, WI (US)

(72) Inventors: Robert J. Koenen, Wauwatosa, WI (US); Scott A. Funke, Wauwatosa, WI (US); Todd Johnson, Wauwatosa, WI (US); Mark Noller, Wauwatosa, WI (US); Nicholas Joseph Ziedler, Wauwatosa, WI (US); Jacob Zuehl, Hartland, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 0 days.

(21) Appl. No.: 17/356,001

(22) Filed: Jun. 23, 2021

(65) Prior Publication Data

US 2021/0408820 A1 Dec. 30, 2021

Related U.S. Application Data

(60) Provisional application No. 63/043,597, filed on Jun. 24, 2020.

(51) Int. Cl.
*B60R 16/033* (2006.01)
*B60P 1/43* (2006.01)
*H02J 7/34* (2006.01)
*H02J 7/00* (2006.01)

(52) U.S. Cl.
CPC ............. *H02J 7/342* (2020.01); *B60P 1/435* (2013.01); *B60R 16/033* (2013.01); *H02J 7/0014* (2013.01)

(58) Field of Classification Search
CPC .... B60L 1/00; B60L 1/006; B60L 1/20; B60P 1/435; B60P 3/14; B60R 16/03; B60R 16/033; H02J 7/00032; H02J 7/00034; H02J 7/00036; H02J 7/00041; H02J 7/0013; H02J 7/0014; H02J 7/007; H02J 7/0071; H02J 7/00712; H02J 7/007182; H02J 7/007188; H02J 7/14; H02J 7/1423; H02J 7/34; H02J 7/342; H02J 2310/40; H02J 2310/46; H02J 2310/48
See application file for complete search history.

(56) References Cited

U.S. PATENT DOCUMENTS

| | | | | |
|---|---|---|---|---|
| 4,735,454 | A * | 4/1988 | Bernard | B60P 1/435 296/61 |
| 9,079,505 | B1 * | 7/2015 | Hyde | G08G 1/202 |
| 2008/0185197 | A1 * | 8/2008 | Nakamura | B60L 15/007 701/112 |
| 2012/0303397 | A1 * | 11/2012 | Prosser | B60L 53/18 705/7.12 |

(Continued)

*Primary Examiner* — Levi Gannon
(74) *Attorney, Agent, or Firm* — Foley & Lardner LLP

(57) ABSTRACT

A transportation vehicle including a plurality of battery packs, a plurality of power equipment, and a controller. The controller is configured to identify at least one of the plurality of power equipment or at least one of the plurality of battery packs that requires charging and direct power through a bus to distribute power to at least one of the plurality of power equipment or at least one of the plurality of battery packs. The plurality of battery packs are configured to recharge the plurality of power equipment.

17 Claims, 7 Drawing Sheets

(56) References Cited

U.S. PATENT DOCUMENTS

| | | | |
|---|---|---|---|
| 2012/0305662 A1* | 12/2012 | Miyano | H01M 10/625 |
| | | | 236/44 C |
| 2013/0175819 A1* | 7/2013 | Hindle | B60L 3/00 |
| | | | 296/24.3 |
| 2018/0102666 A1* | 4/2018 | Margaritis | H02J 7/0044 |
| 2019/0082590 A1* | 3/2019 | Velderman | A01D 69/025 |
| 2019/0160972 A1* | 5/2019 | Zeiler | B60L 53/80 |
| 2019/0230850 A1 | 8/2019 | Johnson et al. | |
| 2019/0359198 A1* | 11/2019 | Velderman | B60L 53/14 |
| 2020/0001732 A1* | 1/2020 | Nohra | B60L 53/60 |
| 2020/0317057 A1* | 10/2020 | Salter | B60K 6/26 |
| 2021/0021139 A1* | 1/2021 | Windsor | H02J 7/0063 |

* cited by examiner

VEHICLE FOR TRANSPORTING AND CHARGING OUTDOOR POWER EQUIPMENT

CROSS-REFERENCE TO RELATED APPLICATION

This Application claims priority to U.S. Provisional Patent Application No. 63/043,597, filed Jun. 24, 2020, the content of which is hereby incorporated by reference in its entirety.

BACKGROUND

A vehicle (e.g., a trailer) may be used to transport various types of equipment, including outdoor power equipment, vehicles, aerial man lifts, floor care devices, golf carts, lift trucks and other industrial vehicles, recreational utility vehicles, industrial utility vehicles, lawn and garden equipment, and energy storage or battery backup systems. Outdoor power equipment includes lawn mowers, riding tractors, snow throwers, pressure washers, portable generators, tillers, log splitters, zero-turn radius mowers, walk-behind mowers, riding mowers, and turf equipment such as spreaders, sprayers, seeders, rakes, and blowers. Outdoor power equipment may, for example, use one or more electric motors to drive an implement, such as a rotary blade of a lawn mower, a pump of a pressure washer, the auger of a snow thrower, and/or a drivetrain of the outdoor power equipment. Vehicles include cars, trucks, automobiles, motorcycles, scooters, boats, all-terrain vehicles (ATVs), personal water craft, snowmobiles, utility vehicles (UTVs), and the like.

SUMMARY

In one embodiment, a transportation vehicle is provided. The transportation vehicle includes battery packs, power equipment, and a controller. The controller is configured to identify at least at least one of the power equipment or at least one of the battery packs that requires charging. Based upon this detection, the controller is configured to direct power through a bus to distribute power to at least one of the plurality of power equipment or at least one of the plurality of battery packs. The battery packs are configured to recharge the plurality of power equipment.

In another embodiment, a transportation and charging system for power equipment is provided. The transportation and charging system includes a transportation vehicle, one or more removable battery packs, one or more pieces of power equipment, a charging system, and a controller. The charging system is configured to supply power to the one or more pieces of power equipment or the one or more removable battery packs. The controller is configured to identify at least one of the one or more pieces of power equipment or the one or more removable battery packs that requires charging and directs power through a bus to distribute power to at least one of the one or more pieces of power equipment.

In yet another embodiment, a trailer is provided. The trailer includes a charging system and one or more pieces of power equipment. The charging system includes several outputs that are configured to provide electrical power at at least two different power levels (e.g., voltages). The outputs include several charging devices that provide available wired connections to transmit power from the charging system. The one or more pieces of power equipment are physically and electrically connected to the plurality of charging devices to receive power from the charging system.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The drawings illustrate the best mode presently contemplated of carrying out the disclosure. In the drawings.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Many landscapers use transportation vehicles, such as trailers, to haul power equipment to and from job sites. In some cases, the landscapers are hired to complete simple, short in-and-out jobs. Additionally, landscapers often have several jobs to complete in a single day, with short drive times between each job site. As such, the ability to rapidly charge power equipment in a short amount of time can be vastly beneficial to landscapers and other operators of power equipment. Furthermore, the capability to charge the power equipment while on-board a transportation vehicle with a built-in charging system can improve job efficiency. Job efficiency can improve by decreasing the amount of time operators waste trying to recharge power equipment before they can start at a new job site or a new task. By being able to quickly charge a battery supply of the power equipment, landscapers can additionally eliminate the cost of needing equipment with a greater energy capacity for the battery supply (e.g., a larger, more expensive battery pack).

Figure 1:
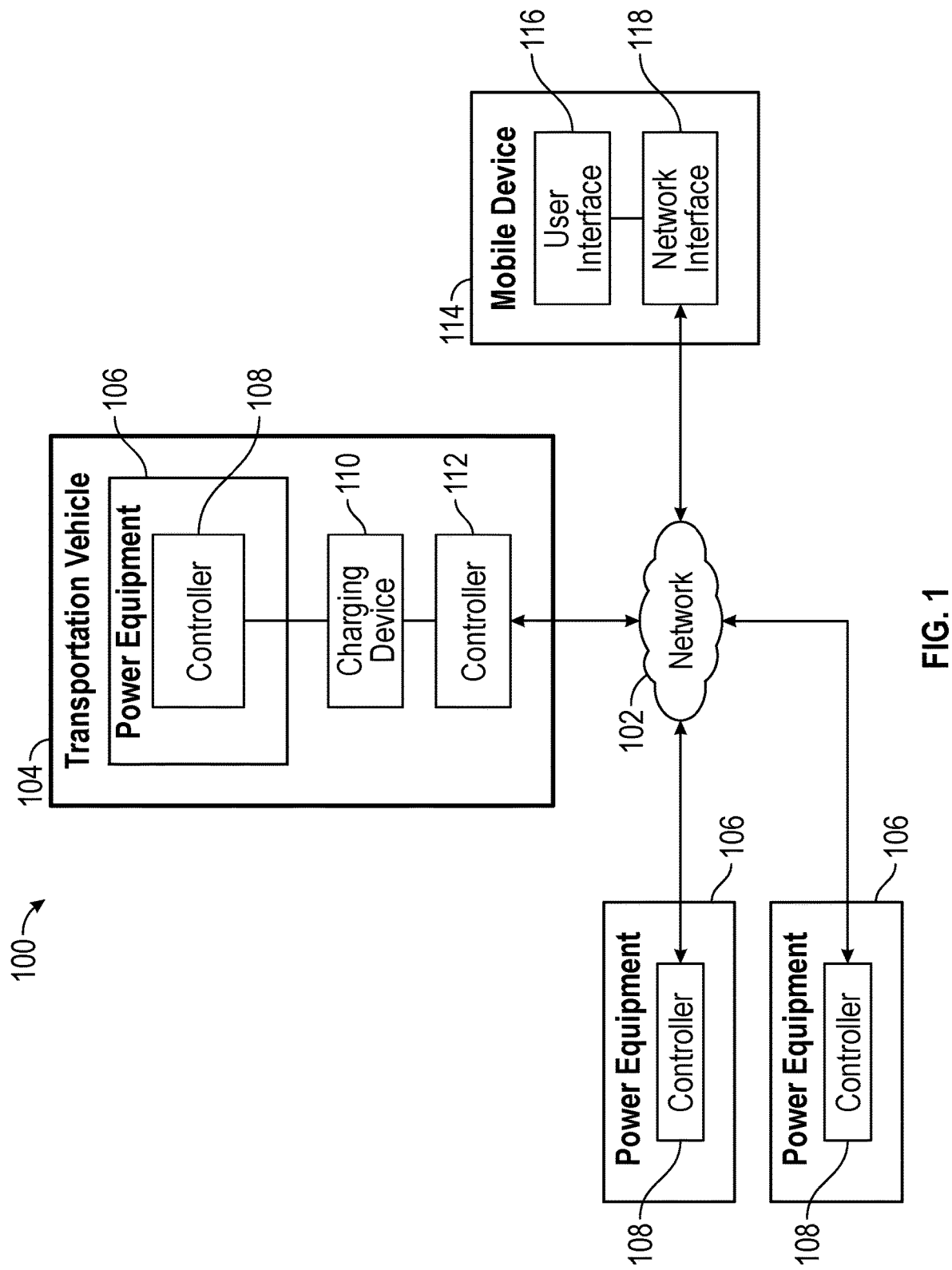
FIG. 1 is a schematic diagram of a transportation and charging system for power equipment, according to an exemplary embodiment.

Referring to FIG. 1, a schematic diagram of a transportation and charging system 100, according to an exemplary embodiment. The system 100 includes a transportation vehicle 104, power equipment 106, and a mobile device 114. The transportation vehicle 104, power equipment 106, and mobile device 114 are configured to communicate over network 102. In some embodiments, the network 102 is a Wi-Fi network, a Bluetooth network, a cellular network, etc.

In some embodiments, the network 102 also includes near-field communications (NFC), Ethernet communications, or a combination of several means of communications. The network 102 can also include wired communication lines. The network 102 may be a cloud-based network that includes an internet of things (IoT) system. The network 102 can allow a fleet of power equipment 106 to be monitored and managed by a user of the mobile device 114 and an operator of the transportation vehicle 104. For example, the mobile device 114, via the network interface 118, communicates an alert to a piece of power equipment 106 to decrease speed to save energy remaining from the main battery supply of the power equipment 106. The remaining power from the main battery supply then can be used to charge a different piece of power equipment 106 at the transportation vehicle 104.

Figure 4:
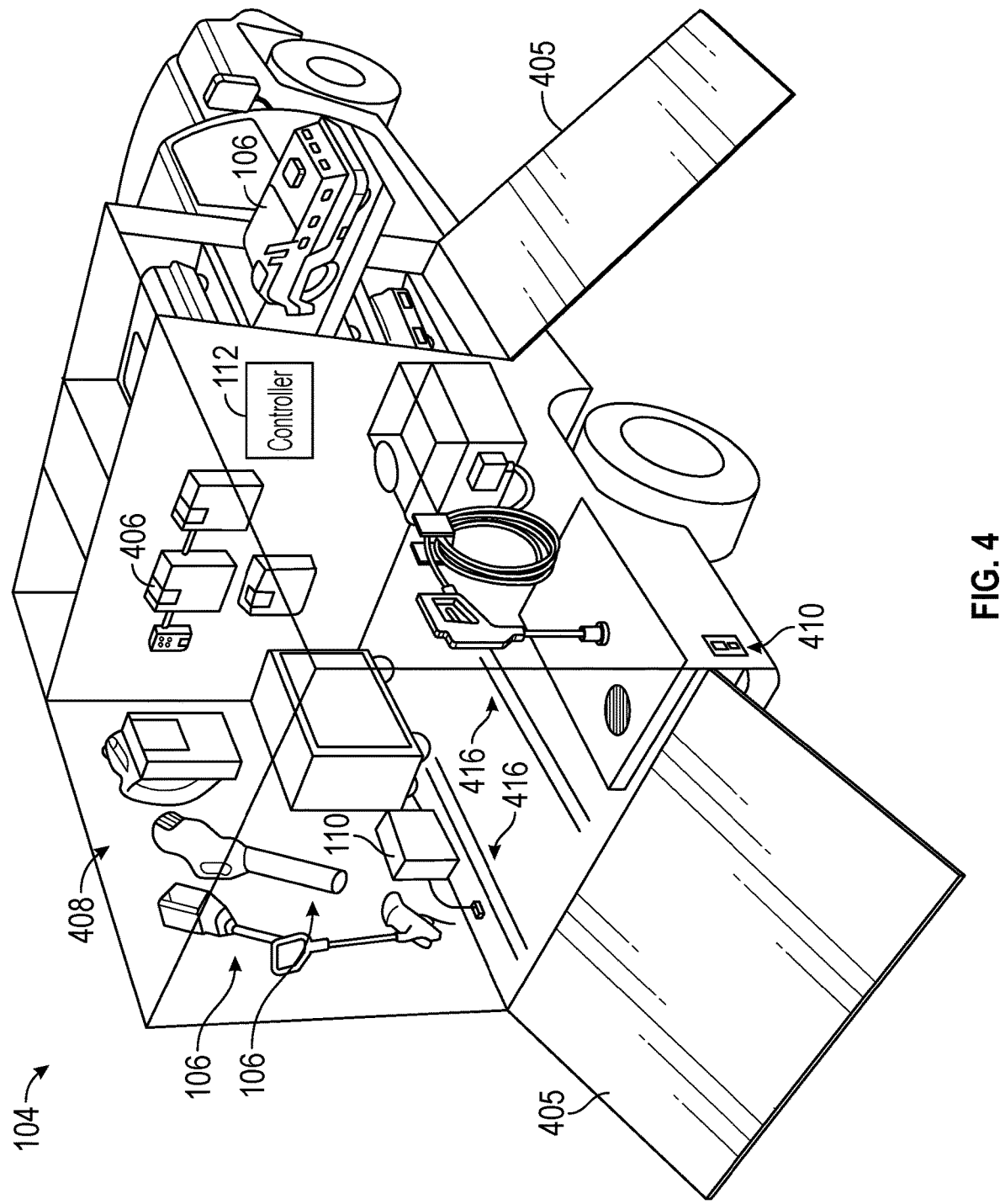
FIG. 4 is a perspective view of the transportation vehicle associated with the power equipment of FIG. 1, according to an exemplary embodiment.

In some embodiments, the transportation vehicle 104 is used by a lawn care service or outdoor maintenance service to transport tools and equipment (e.g., power equipment 106), to and from jobsites. The charging system of the transportation vehicle 104 can include one or more charging devices 110, such as a charging station, portable generator, docking stations interconnected via a power bus, batteries, solar panels, etc. The transportation vehicle 104 also includes a controller 112. A piece of power equipment 106 can be transported and charged within (or proximate) the transportation vehicle 104. There may be one or more controllers 112 used in operation of the charging device 110 and operation of the power equipment 106 stored and transported within the transportation vehicle 104. The transportation vehicle 104 may include one or more ramps (405 as shown in FIG. 4) for loading and unloading the power equipment, described in greater detail below with reference to FIG. 4. In some embodiments, the transportation vehicle 104 is an electric trailer that has multiple methods for charging equipment on the trailer. For example, the transportation vehicle 104 may be a utility trailer with a ramp that has a 20 kiloWatt-Hour (kW-Hr) energy capacity from battery packs capable of recharging power equipment 106 while in transport. In other embodiments, the transportation vehicle 104 may include an energy capacity greater or less than a 20 kW-Hr capacity. In some embodiments, the transportation vehicle 104 is a trailer that is capable of connecting to a power source (e.g., utility power) to charge all of the power equipment 106 within the transportation vehicle 104. For example, the transportation vehicle 104 may include a charging dock station for each piece of power equipment 106. In another example, the transportation vehicle 104 includes a charging rack to recharge the power equipment 106 and/or charging device 110. In other embodiments, the transportation vehicle 104 includes a wired charging system with one or more power levels (e.g., voltage ratings) to provide power to the equipment 106, which can be powered by batteries having different characteristics and capacities. For example, some embodiments of the transportation vehicle 104 include a charging system that is configured to provide charging to equipment at 48 V, as well as equipment at 12 V. The transportation vehicle also includes a charging device 110 and a controller 112. In some embodiments, the piece of power equipment 106 may be configured to be charged wirelessly using inductive charging. Electromagnetic induction may provide electricity to the power equipment 106 without having to rely on the wired charging system or charging dock station.

In some embodiments, the charging device 110 is a charging system with a bus to distribute power to various power equipment 106 coupled to the charging system via ports (i.e., outlets) on the power equipment 106. In other embodiments, the charging device 110 is an engine and alternator of the transportation vehicle 104. For example, the engine and alternator of the transportation vehicle 104 continues to run while the transportation vehicle 104 is parked and in a battery charge mode. The controller 112 of the transportation vehicle 104 may then direct the energy produced from the engine and alternator to provide energy to power equipment 106, rather than to electrical systems of the transportation vehicle 104. In some embodiments, the charging device 110 is a portable or fixed, rechargeable battery pack stored on the transportation vehicle 104 to supply backup power to various pieces of power equipment 106. In some embodiments, the charging device 110 is a portable generator. In some embodiments, the charging device 110 is a piece of power equipment 106 with a primary battery pack that the power equipment 106 normally uses to operate. For example, a primary battery supply of one piece of power equipment 106 may be used to charge a battery supply of a different piece of power equipment 106 that still is needed to complete a job. In some embodiments, the transportation vehicle 104 includes several charging devices 110. For example, the transportation vehicle 104 has a charging rack for several charging devices 110 (e.g., battery packs) to be stored and/or recharged. In some embodiments, the battery charger may include a DC to DC voltage converter configured to step down the voltage from the engine and/or alternator to a voltage that the battery charger can more readily use and distribute amongst the batteries within the power equipment 106.

In various embodiments, the charging device 110 is structured to automatically charge the power equipment 106 in different situations and environments. In some embodiments, the charging device 110 automatically begins to recharge a piece of power equipment 106 at a predetermined time. For example, the controller 112 of the transportation vehicle 104 instructs any charging device 110 coupled to a charging port on a piece of power equipment 106 to begin recharging the connected power equipment 106, whenever the transportation vehicle 104 is in motion. In other embodiments, the power equipment 106 remaining on-board the transportation vehicle 104 begins to recharge when the controller 112 detects that less than half of the power equipment 106 assigned to the transportation vehicle 104 remain within the transportation vehicle 104 or that a piece of power equipment 106 will be needed to finish a job soon. In some embodiments, the charging device 110 only provides power to connected power equipment 106 after receiving a signal from the controller 112 to start charging a power supply (e.g., battery) of the power equipment 106.

The system 100 also includes the mobile device 114. The mobile device 114 may be a phone, a tablet computer, a laptop computer, etc. of a user of the power equipment 106. In some embodiments, the mobile device 114 is another kind of computing device of a user, such as a hybrid or combination of a tablet and laptop that has features of both. For example, the mobile device 114 is a phone of an operator of the transportation vehicle 104. In other embodiments, the mobile device 114 may be a personal computer of a manager for a fleet of equipment (e.g., power equipment 106). The mobile device 114 is shown to include a user interface 116 and a network interface 118. The user interface 116 may include a touch screen, a display screen, and several other input/output devices, such as a keyboard, a pen, a speaker, a microphone, etc. The user interface 116 can be configured to receive inputs from a user of the mobile device 114. For example, the user interface 116 may receive an input from a manager of a fleet of power equipment 106 to change a mode of the transportation vehicle 104 to a battery charge mode.

In some embodiments, the network interface 118 includes the hardware and logic necessary to communicate over multiple channels of data communication. For example, the network interface 118 may include a Wi-Fi interface, a cellular modem, a Bluetooth transceiver, a Bluetooth beacon, a radio-frequency identification (RFID) transceiver, a near-field communication (NFC) transceiver (e.g., NFC tag reader) and an NFC tag, a Controller Area Network (CAN) transceiver, or a combination thereof. The network interface 118 may enable data communication to and from the network 102. In some embodiments, data passing through the network interface 118 is encrypted such that the communications over the network 102 and other entities (e.g., the controller 112 of the transportation vehicle 104 or the controller(s) 108 of the power equipment 106, etc.) are secure. The network interface 118 can be configured to communicate over two or more different radio frequencies. For example, the NFC tag reader within the network interface 118 can be configured to detect NFC tags or devices emitting signals at one or more of low frequency (e.g., between about 120 kHz to 140 kHz) and a Bluetooth transceiver within the network interface 118 can be configured to communicate over a higher frequency (e.g., about 13.56 MHz).

Figure 2:
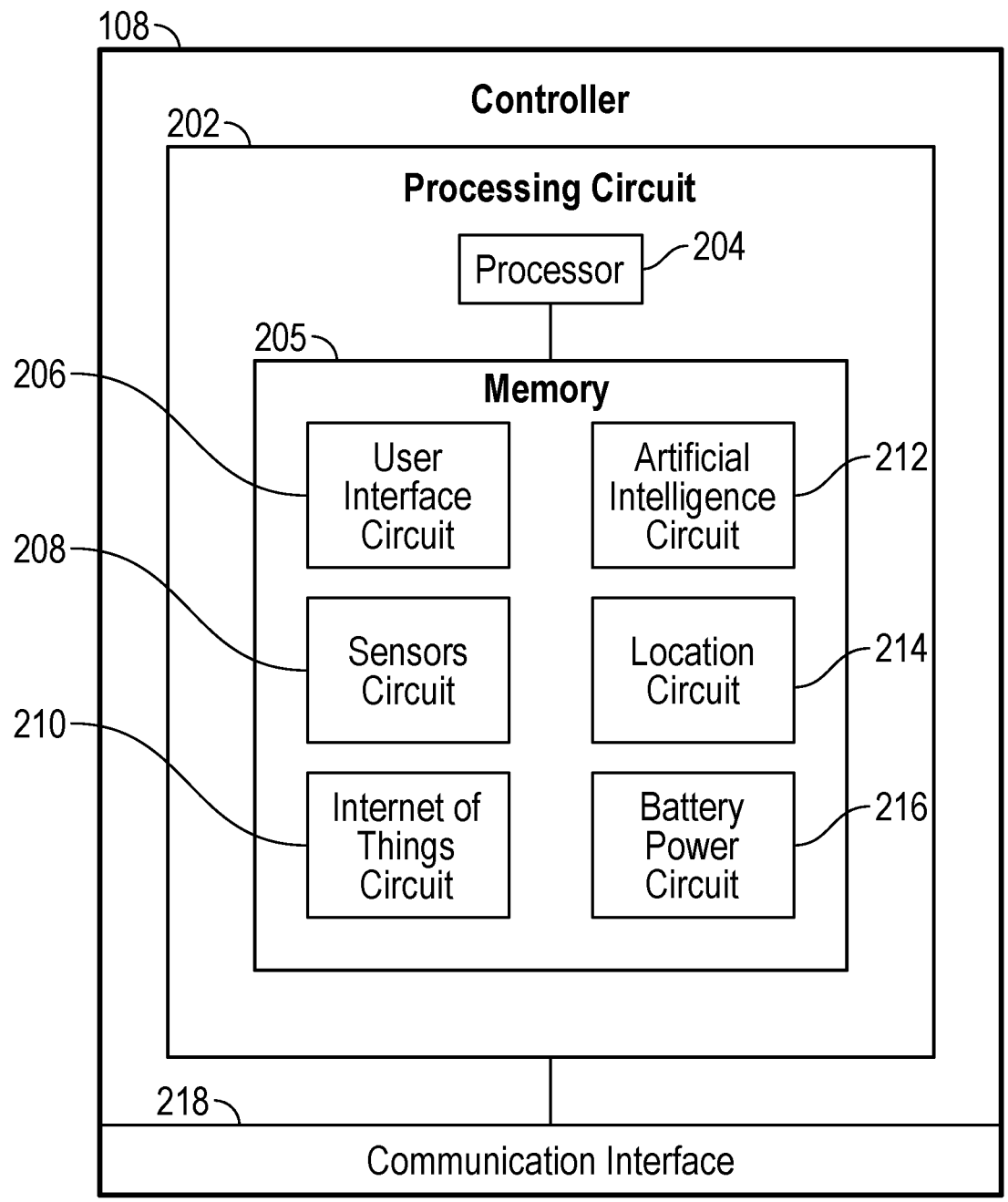
FIG. 2 is a schematic diagram of a controller of the power equipment of FIG. 1.

Referring now to FIG. 2, a schematic diagram depicting the controller 108 associated with the power equipment 106 is shown, according to an exemplary embodiment. The controller 108 includes a processing circuit 202. The processing circuit 202 includes a processor 204 and a memory 205. The processor 204 may be a general purpose or specific purpose processor, an application specific integrated circuit (ASIC), one or more field-programmable gate arrays (FPGAs), a group of processing components (e.g., parallel processing units), a neural network processing system, or other applicable processing circuits. The processor 204 can be configured to execute computer code or instructions stored in the memory 205 or received from other computer readable media, such as physical media (e.g., CD-ROM, DVD-ROM, flash drive, etc.). The memory 205 may include one or more devices (e.g. memory units, memory devices, storage devices, etc.) for storing data and/or computer code for completing and/or facilitating the functions and processes described in the present disclosure. The memory 205 may include random access memory (RAM), read-only memory (ROM) hard drive storage (physical or solid state), temporary storage, non-volatile memory, flash memory, optical memory, or any other suitable memory component for storing software objects and/or computer instructions. The memory 205 may include database components, object code components, script components, or any other type of information structure for supporting the various functions and information structures described in the present disclosure. The memory 205 may be communicably connected to the processor 204 via the processing circuit 202 and may include computer code for executing (e.g. by the processor) one or more processes described herein.

The controller 108 further includes a communication interface 218. In some embodiments, the communication interface 218 enables the controller 108 to be communicably connected to the network 102 to transmit and receive data from one or more mobile devices 114 and/or a user interface of the transportation vehicle 104 (e.g., a dashboard displayed within a utility vehicle). In some embodiments, the communication interface 218 is a wireless interface that utilizes wireless protocols, such as Wi-Fi, cellular (e.g., LTE, 4G, etc.), Bluetooth, near-field communication (NFC), radio frequency identification (RFID), Zigbee, etc. In other embodiments, the communication interface 218 includes a wired interface, such as a serial communication interface that uses protocols such as a serial peripheral interface (SPI) bus, universal serial bus (USB), controller area network (CAN) bus, and so on.

The memory 205 may be communicably connected to one or more circuits for the processor 204. In some embodiments, the memory 205 is communicably connected to a user interface circuit 206, a sensors circuit 208, an IoT circuit 210, artificial intelligence (AI) circuit 212, a location circuit 214, and a battery power circuit 216. In other embodiments, the circuits that communicate with the memory 205 are integrated together and a fewer amount of circuits carry out the same amount of functions. Furthermore, functions described with regard to a particular circuit may also be carried out in part by another circuit. The various circuits may send and receive inputs and outputs from the other circuits of the controller 108. In other embodiments, the memory 205 communicates with additional circuits that are not shown in this exemplary embodiment. For example, another circuit may be integrated with the processing circuit 202 to configure the controller 108 to monitor the safety of the operation of power equipment 106 to ensure that the battery supply of the power equipment 106 does not recharge too quickly and cause harm to the internal components (e.g., battery supply, wiring system, etc.) of the power equipment 106.

In some embodiments, the user interface circuit 206 is configured to control a user interface (e.g., a user interface of the autonomous lawn mower 500 (FIG. 5), dashboard 602 of the mower 600 (FIG. 6), etc.) of the power equipment 106. The user interface circuit 206 can receive inputs from one or more user input devices (e.g., mobile device 114), process the inputs, and send the processed inputs to the user interface of the power equipment 106 and/or other circuits that are communicably connected with memory 205. For example, the user interface circuit 206 may receive an input from the communication interface 218 that the power equipment 106 should be operating in recharge mode on the transportation vehicle 104. The user interface circuit 206 may then instruct the communication interface 218 to transmit an alert to a display screen of the power equipment 106 and/or mobile device 114 that notifies an operator of the need to return to the transportation vehicle 104 to recharge the battery. The user interface circuit 206 may also receive inputs from an operator of the power equipment 106 to adjust the speed and directions of the various components of the power equipment 106. For example, an operator of the power equipment 106 may manually adjust their speed by using levers, a switch or a slider to change the speed of the power equipment 106.

The sensors circuit 208 can be configured to monitor and manage the sensors of the power equipment 106. In some embodiments, the sensors circuit 208 is configured to gather data from several sensors, process the data, and alternatively deliver the processed data to the other circuits as needed, such as the location circuit 214 or the battery power circuit 216. For example, location data from a GPS sensor of the power equipment 106 can be processed by the sensors circuit 208 and output to the location circuit 214 to finish determining a location of the power equipment (e.g., 100 feet away). In other embodiments, the sensors circuit 208 processes inputs received from the battery supply of the power equipment 106 (e.g. internal temperature, current, voltage, etc.) and determines a health risk for the battery supply. The sensors circuit 208 can also process and provide an output of how much remaining time the power equipment 106 can run off the battery supply before needing to recharge.

The IoT circuit 210 may be configured to communicate with one or more user devices (e.g., mobile device 114) over the network 102 via the communication interface 218. In some embodiments, this allows a user (e.g., a manager of a fleet of power equipment 106) to access the controller 108 to change operation of the power equipment 106 via mobile device 114. The mobile device 114 may include one or more client-side and/or operator-side applications which may be configured to directly communicate to the controller 108 via the communication interface 218. For example, the IoT circuit 210 may receive an instruction sent by a manager from the mobile device 114 to power down the battery or motors of the power equipment 106 via NFC, Zigbee, Bluetooth, etc. In some embodiments, the IoT circuit 210 receives data from the other circuits of the controller 108, processes the data, and transmits the data to mobile device 114 or to a cloud-based IoT system via the communication interface 218 over network 102. The IoT circuit 210 can include several software applications configured to receive instructions from the communication interface 218 and process the data received. In some embodiments, the IoT circuit 210 may transmit the state-of-charge (SoC) of a battery of the power equipment 106 to the network 102. Therefore, a manager may be able to determine whether the battery can be used to recharge other power equipment 106 and/or whether sufficient power is available from the transportation vehicle 104 to recharge the battery of the power equipment 106 if needed. In some embodiments, the IoT circuit 210 may transmit variables of the corresponding piece of power equipment 106, such as a location, speed, efficiency, time since motors began running (i.e., operating), time since the power equipment 106 was last charged by the charging system of the transportation vehicle 104, estimated run-time, etc.

Still referring to FIG. 2, the AI circuit 212 can be configured to predict when the power equipment 106 will run out of power from a primary battery supply (e.g., battery 614 (FIG. 6)) and other parameters of the power equipment 106. In some embodiments, the AI circuit 212 includes several machine-learning algorithms and other artificial intelligence models to provide the controller 108 the capability to learn patterns and uses of the power equipment 106. The AI circuit 212 may communicate an expected time the power equipment 106 will need to be recharged to the IoT circuit 210. Further, the AI circuit 212 may receive from the IoT circuit 210 a type of job the respective power equipment 106 is being used to complete, past operation data for the power equipment 106, instructions from a user of the mobile device 114 to operate the power equipment 106 at a certain speed or in a certain direction, etc. In some embodiments, the AI circuit 212 is also configured to determine optimal control of components of the power equipment 106 to extend an estimated operation time of the power equipment 106 based on a remaining charge of the battery supply. For example, the AI circuit 212 may determine to deactivate operation of an implement coupled to the power equipment 106 that is using above a threshold percentage of energy from the primary battery supply of the power equipment 106.

In some embodiments, the location circuit 214 is configured to control and detect a position of the power equipment 106. The location circuit 214 may receive location data from a global positioning system (GPS) sensor of the power equipment 106. The location circuit 214 may receive instructions from the IoT circuit 210 to change the location of the power equipment 106. For example, the location circuit 214 may receive, as an input, an instruction for the power equipment 106 to return to the transportation vehicle 104 (e.g., a utility trailer) to recharge. Accordingly, the location circuit 214 may calculate a new direction for the power equipment 106 to drive in and/or change a direction of the drive wheels of the power equipment 106. In some embodiments, the location circuit 214 sends this data to the user interface circuit 206 to display a new destination of the power equipment 106 on a display (e.g., dashboard 602 (FIG. 6)) to alert an operator of the power equipment 106. In some embodiments, the location circuit 214 transmits data to the AI circuit 212 for the machine-learning algorithms to predict whether the power equipment 106 has sufficient power remaining in a main battery supply to return to the transportation vehicle 104. In some embodiments, when the location circuit 214 determines that the power equipment 106 is on board the transportation vehicle 104, the location circuit 214 is configured to send this information to the IoT circuit 210. As such, a manager of a fleet of several pieces of power equipment 106 may receive this information via the mobile device 114 and select an option presented on the mobile device 114 to begin recharging the power equipment 106 using the charging device 110.

The battery power circuit 216 may be configured to control and monitor a remaining charge of the main battery supply of the power equipment 106. For example, the battery power circuit 216 is configured to prevent recharging of the main battery supply from the charging device 110. The battery power circuit 216 may prevent recharging of the power equipment 106 in response to receiving data from the sensors circuit 208 that the main battery supply is above a threshold temperature or has detected faults. In some embodiments, the battery power circuit 216 is configured to receive instructions from the IoT circuit 210 to use energy from the main battery supply of the corresponding power equipment 106 to recharge a battery supply of different piece of power equipment 106. The battery power circuit 216 can be configured to detect when the charging device 110 is coupled to the power equipment 106 (e.g., via an electric port proximate the battery of the power equipment 106). The battery power circuit 216 may then begin recharging the primary battery supply of the power equipment 106. In some embodiments, the battery power circuit 216 is configured to stop recharging of the main battery supply when a sufficient amount of energy is available to complete a job using the power equipment 106.

Figure 3:
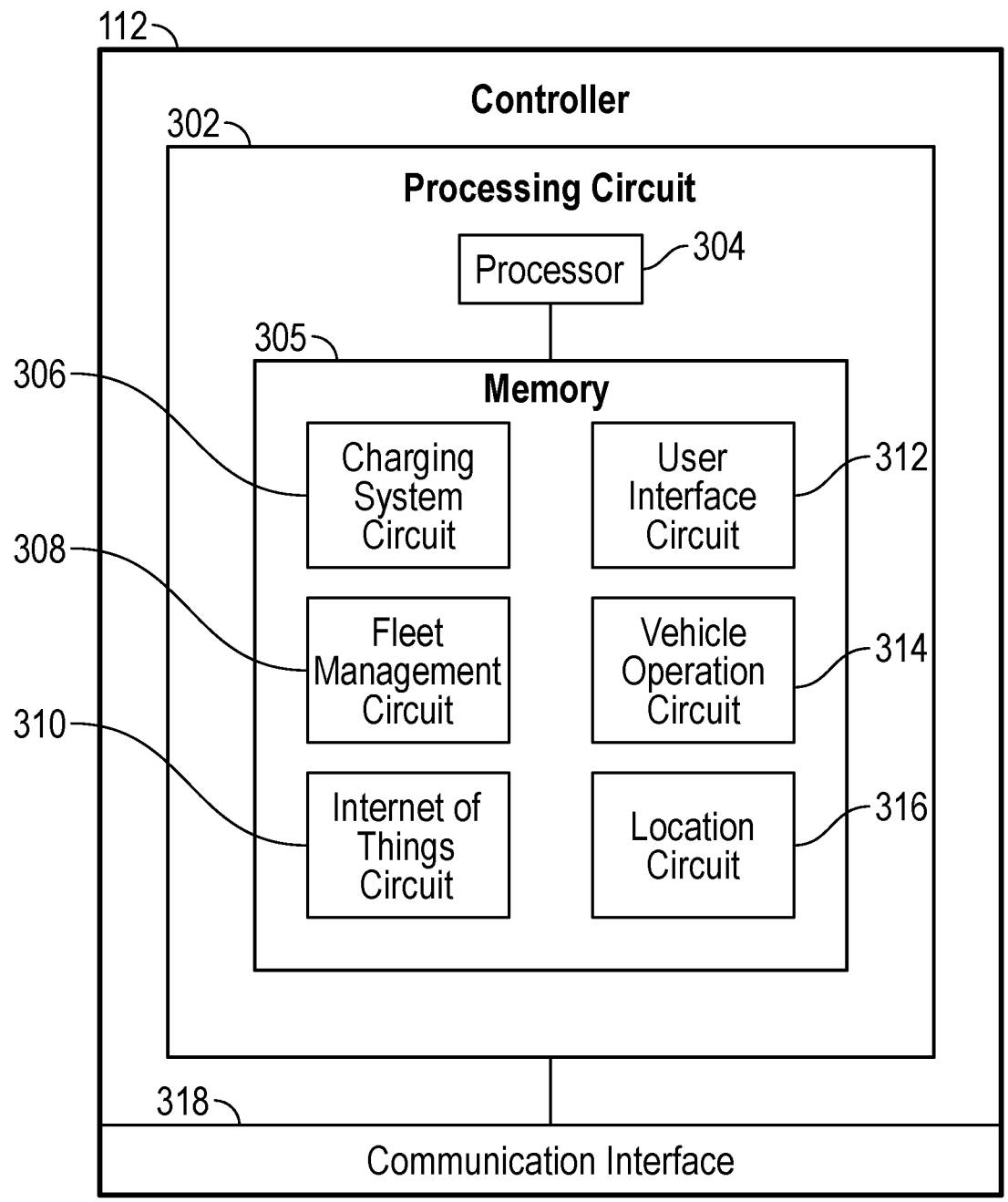
FIG. 3 is a schematic diagram of a controller of the transportation vehicle of FIG. 1.

Turning now to FIG. 3, a schematic diagram of the controller 112 associated with the transportation vehicle 104 is shown, according to some embodiments. In some embodiments, the controller 112 is integrated with the transportation vehicle 104 to monitor and control a charging system of the transportation vehicle 104. In other embodiments, the controller 112 may be integrated and positioned within the charging device 110 of the transportation vehicle 104. For example, the controller 112 may be built-in with a portable generator located within the transportation vehicle 104 or a charging station on the transportation vehicle 104. The controller 112 includes a processing circuit 302. The processing circuit 302 includes a processor 304 and a memory 305. The processor 304 is structured the same or similar as the processor 204 of FIG. 2, and the memory 305 is structured the same or similar as the memory 205. In some embodiments, the communication interface 318 is structured the same or similar as the communication interface 218. The memory 305 is communicably connected with one or more circuits for the processor 304. In some embodiments, the memory 305 is communicably connected to a charging system circuit 306, a fleet management circuit 308, an IoT circuit 310, a user interface circuit 312, a vehicle operation circuit 314, and a location circuit 316.

In some embodiments, the charging system circuit 306 is configured to monitor the charging system of the transportation vehicle 104. In some embodiments, the charging system circuit 306 is also configured to track the level of charge of each battery supply of power equipment 106. For example, the charging system circuit 306 may receive the various power equipment 106 in a monitored fleet and battery data for each piece of power equipment from the IoT circuit 310. The charging system circuit 306 can then determine which power equipment 106 require recharging sooner than other power equipment 106. In some embodiments, the prioritization of recharging a battery supply of power equipment 106 connected to the charging system is done based on which power equipment 106 has the lowest amount of remaining runtime. In other embodiments, the prioritization is based on which power equipment 106 will be most needed at the job site or at the next job site. The charging system circuit 306 can also be configured to control when the charging device 110 begins recharging a battery supply of the power equipment 106. In some embodiments, the charging system circuit 306 is also configured to detect whether the charging device 110 is at a low power level (e.g., when the charging device 110 is a rechargeable battery pack). In response to determining a low power level, the charging system circuit 306 may send to the IoT circuit 310 a signal to transmit a notification to the network 102 that the transportation vehicle 104 needs to be connected to a power source (e.g., a utility power source via power outlet 410 (FIG. 4)). In some embodiments, the charging system circuit 306 is also configured to detect when the transportation vehicle 104 is receiving power from an external power source.

The fleet management circuit 308 is configured to receive data on a tracked fleet of power equipment 106 and update information on each piece of power equipment 106 transported by the transportation vehicle 104 as new data is received. For example, the fleet management circuit 308 may receive information on types of each power equipment 106, the expected operation time for each power equipment 106, a job site to operate each piece of power equipment 106, an expected start time (e.g., time of day) for each piece of power equipment 106, a maximum amount of operation time for each piece of power equipment 106 based on the battery supply of the power equipment 106, etc. The fleet management circuit 308 can also be configured to track the progress of completing an overall job with the power equipment 106. For example, the fleet management circuit 308 may determine that only half of the individual tasks (e.g., trim bushes, mow lawn, clear debris from flowerbeds) for a job (e.g., lawn maintenance for a home) have been completed thus far. In some embodiments, this information can then be used to predict whether the power equipment 106 that are still needed to finish each task for the overall job have enough available power from their respective battery supplies, whether the charging device 110 is needed to recharge the needed power equipment 106, and/or whether the charging device 110 has the capacity to recharge the battery supply of the needed power equipment 106 to a sufficient battery charge to complete each task for the overall job.

In some embodiments, the IoT circuit 310 is configured to communicate with mobile devices 114 and the controllers 108 of the power equipment 106 over the network 102. The IoT circuit 310 can be configured to transmit and receive data via the communication interface 218. This may allow a manager of a fleet of power equipment 106 to access the controller 112 to modify operation of the transportation vehicle 104 via mobile device 114, for example. The mobile device 114 may include one or more client-side and/or operator-side applications, which may be configured to directly communicate to the controller 112 via the communication interface 318. For example, the IoT circuit 310 may receive an instruction from the mobile device 114 to change a mode of the transportation vehicle from a "transportation mode" to a "battery charge mode." As such, energy generated by the engine and alternator of the transportation vehicle 104 may be utilized to provide energy for the charging system to recharge power equipment 106, rather than to provide power to electrical systems of the transportation vehicle 104. In some embodiments, the IoT circuit 310 receives data from the other circuits of the controller 112 and transmits the data to mobile device 114 or to a cloud-based IoT system via the communication interface 318. In some embodiments, the IoT circuit 310 includes several software applications configured to receive instructions from the communication interface 318 and process the data received. In some embodiments, the IoT circuit 310 is configured to transmit updated data on the power equipment 106 and the transportation vehicle 104 to a fleet management system stored in a cloud connected with the network 102.

In some embodiments, the user interface circuit 312 is configured to control a user interface of the transportation vehicle 104. For example, the user interface circuit 312 receives an alert or notification from the IoT circuit 310, processes the alert or notification, and outputs the alert or notification to a dashboard proximate an operator area of the transportation vehicle 104. In some embodiments, the user interface of the transportation vehicle 104 is a display screen integrated with the controller 112. The user interface circuit 312 may also be configured to process data received from an input device, such as a touch screen, keypad, microphone, etc. of the transportation vehicle 104. The user interface circuit 312 may then transmit this information to other circuits communicably connected to the memory 305 to utilize in other functions of the controller 112. For example, an operator of the transportation vehicle 104 may manually shut off the charging system of the transportation vehicle 104 via a display screen. As such, the user interface circuit 312 then transmits the instruction to power off the charging system of the transportation vehicle 104 to the charging system circuit 306.

The vehicle operation circuit 314 can be configured to communicate directly with several vehicle control systems via the communication interface 318. For example, the communication interface 318 interfaces with the Vehicle Communication Interface (VCI) associated with the transportation vehicle 104. The communication interface 318 can communicate with the VCI associated with the transportation vehicle 104 via several protocols, such as AFDX, ARINC 429, Byteflight, CAN, D2B, FlexRay, DC-Bus, IDB-1394, IEBus, I2C, ISO 9141, J1708, J1587, J1850, J1939, Keyword Protocol 2000, LIN, MOST, Multifunction Vehicle Bus, SMARTwireX, SPI, VAN, or other applicable protocols. As such, the vehicle operation circuit 314 can access operation data of the transportation vehicle 104, for example, fuel economy data, engine data, emissions data, safety system data, charging system data, and so on. The vehicle operation circuit 314 may then send the operation data to the charging system circuit 306 to determine how much capacity remains for the charging system of the transportation vehicle 104 to recharge one or more power equipment 106. In some embodiments, the vehicle operation circuit 314 is configured to control the ramp (405 as shown in FIG. 4) of the transportation vehicle 104 to load and unload the one or more pieces of power equipment 106. For example, the vehicle operation circuit 314 is configured to instruct the ramp to lower in response to receiving from the IoT circuit 310 that a piece of power equipment 106 is located within a predetermined distance (e.g., 5 feet, 10 feet) of the transportation vehicle 104.

In some embodiments, the location circuit 316 is configured to determine the position of the transportation vehicle 104. In other embodiments, the location circuit 316 is configured to calculate a future location for the transportation vehicle 104 and determine a route to that location. This information can then be transmitted to the IoT circuit 310 to calculate whether the transportation vehicle 104 has sufficient fuel or energy to reach the next location. The IoT circuit 310 may then determine if the engine of the transportation vehicle can be used to recharge a battery supply of one or more pieces of power equipment 106 within the transportation vehicle 104. The location circuit 316 may determine the position of the transportation vehicle 104 from location data received by a GPS sensor of the transportation vehicle 104. In some embodiments, the location circuit 316 is configured to output the position of the transportation vehicle 104 to the IoT circuit 310. The position of the transportation vehicle 104 may then be transmitted to one or more controllers 108 of several pieces of power equipment 106 within a tracked fleet of equipment and/or a mobile device 114. As such, the distance between each piece of power equipment 106 and the transportation vehicle 104 can be determined. Further, users of mobile devices 114 (e.g., a manager of the fleet of equipment, operators of the fleet of equipment) may be able to view and track the location of the transportation vehicle 104. The location circuit 316 can also be configured to provide the location of the transportation vehicle 104 to the user interface circuit 312. Accordingly, an operator of the transportation vehicle 104 (e.g., a driver) may be able to navigate through a determined route for the transportation vehicle 104 to reach a new job site.

Referring now to FIG. 4, a perspective view of the transportation vehicle 104 is shown, according to some embodiments. The transportation vehicle 104 may be utilized by a commercial lawn care or landscaping service to transport tools and power equipment 106, such as autonomous lawn mowers 500 (FIG. 5) and stand-on mowers 600 (FIG. 6). Other power equipment may be used. In some embodiments, the transportation vehicle 104 may be configured to deliver, monitor, and/or control one or more pieces of power equipment 106. As shown in FIG. 4, the transportation vehicle 104 is configured to include loading/unloading ramps 405, a charging station 406, equipment storage area 408, power outlet 410, a controller 112, a charging device 110, and a docking station 416, according to some embodiments.

The charging system of the transportation vehicle 104 includes the charging station 406. In some embodiments, the charging station 406 may be configured to store and charge one or more batteries, such as batteries 504 (FIG. 5) or batteries 614 (FIG. 6). The spare batteries stored on transportation vehicle 104 can be installed into one of the pieces of power equipment 106 to replace a battery (e.g., autonomous lawn mower 500 (FIG. 5)). As such, when there is not enough time to charge the power equipment 106 between job sites, not enough energy remaining from the charging device 110, and/or when the transportation vehicle 104 is not proximate a utility power source to receive backup power for the charging system, the spare batteries stored in the charging station 406, that have adequate SoC, may allow continued operation of the power equipment 106. In some embodiments, the charging station 406 may be powered by an engine and alternator or other power system of the transportation vehicle 104. In some embodiments, charging device 110 (e.g., a portable generator) is used to power the charging station 406. In other embodiments, the charging device 110 is integrated with the charging station 406. For example, the charging device 110 is directly wired via a power bus to the charging station 406. In some embodiments, the controller 112 monitors the SoC of each battery coupled to the charging station 406. The controller 112 may also control which of the batteries in the charging station 406 receive power from the charging system of the transportation vehicle 104.

The power equipment 106 (e.g., autonomous lawn mowers 500, mowers 600) may access the transportation vehicle 104 via one of the loading/unloading ramps 405. In some embodiments, the loading/unloading ramp 405 may be automatically deployed in response to a piece of power equipment 106 approaching the transportation vehicle 104. For example, the controllers 108 of the power equipment 106 may transmit a signal to the controller 112 on the transportation vehicle 104 to lower one of the loading/unloading ramps 405. In some embodiments, the power equipment 106 may be configured to automatically drive up the loading/unloading ramps 405. In some embodiments, the loading/unloading ramp 405 may be manually controlled by a user, such as by activating a switch or other control device, or by manually lowering and raising the ramp via a mechanical mechanism. In some embodiments, the loading/unloading ramps 405 may be automatically raised and lowered using various applications, such as an electric motor, hydraulic actuators, linear electric actuator, pneumatic actuators, and so on.

The loading/unloading ramp 405 may also be configured to lower in order to unload one or more pieces of power equipment 106 at a job site. In some embodiments, the loading/unloading ramp 405 may be automatically deployed when the transportation vehicle 104 arrives at a worksite. In some embodiments, the controller 112 may receive a signal from a mobile device 114 of the driver of the transportation vehicle 104 that it has arrived at the job site. In response, the controller 112 may instruct a loading/unloading ramp 405 to lower to allow one or more pieces of power equipment 106 to exit the transportation vehicle 104 and begin operation at the jobsite. In some embodiments, a user manually lowers the loading/unloading ramp 405 when arriving at the job site, such as by operating a control device (e.g. switch, pushbutton).

The equipment storage area 408 may be used to store various power equipment 106 (e.g., outdoor power equipment), such as edge trimmers, seeders, blowers, vacuums, power rakes, zero turn mowers, manual push lawn mowers, power trimmers, tools, and any other required equipment needed to service a given jobsite. The outdoor power equipment may be fossil fuel powered (e.g. via an internal combustion engine), electrically powered (e.g. via Li-Ion batteries), or a combination thereof. In some embodiments, the electrically powered outdoor power equipment may be powered using a battery of the same type as battery 504 (FIG. 5) or battery 614 (FIG. 6) described further below.

However, in other embodiments, other battery types may be used to power the power equipment 106.

Still referring to FIG. 4, in some embodiments, the power outlet 410 is a port accessible from the outside of the transportation vehicle 104 to receive a connection to a utility power source or other secondary power source. The controller 112 can be configured to detect when a power source is connected to the power outlet 410. The controller 112 is also configured to then direct power to the charging system. For example, the controller 112 can direct the power to begin recharging a battery supply of the piece of power equipment 106 coupled to the charging system with the lowest SoC. In other embodiments, the controller 112 may direct power to begin recharging a battery supply of the next piece of power equipment 106 that will be needed to accomplish a task at the job site. Further, the controller 112, via the charging system circuit 306, can be configured to first determine that accepting power from the connected power source will not damage the charging system of the transportation vehicle 104 or electrical components (e.g. battery) of the power equipment 106. In some embodiments, the power outlet 410 includes both power ports and communication ports to couple to another power source (e.g., utility power).

In some embodiments, the transportation vehicle 104 includes a docking station 416 for one or more pieces of power equipment 106 (e.g., mower 600). Although a single docking station 416 is shown in FIG. 4, the transportation vehicle 104 may include several other docking stations 416. In some embodiments, the docking station 416 includes two recesses in the floor of the transportation vehicle 104 for wheels of the power equipment 106 to roll into, to secure the power equipment 106 in place, on board the transportation vehicle 104. In some embodiments, the docking station 416 includes sensors (e.g., pressure sensors, temperature sensors, optical sensors, etc.) to detect when a piece of power equipment 106 is positioned in the docking station 416. In some embodiments, when the power equipment 106 is secured to the docking station 416, the charging device 110 begins recharging the power equipment 106. The controller 112, via the fleet management circuit 308, may be configured to determine whether a piece of power equipment 106 that is supposed to be at a docking station 416 recharging is unaccounted for within the transportation vehicle 104. Multiple docking stations 416 may be included with the transportation vehicle 104. In some embodiments, the docking station 416 may use wired power transfer via electromechanical coupling. The wired power transfer connection may include a communications connection to controller 112. In other embodiments, the docking station may use wireless power transfer (e.g. inductive charging). In still other embodiments, the docking station may use a hybrid configuration for power transfer, including both wired and wireless power transfer.

Figure 5:
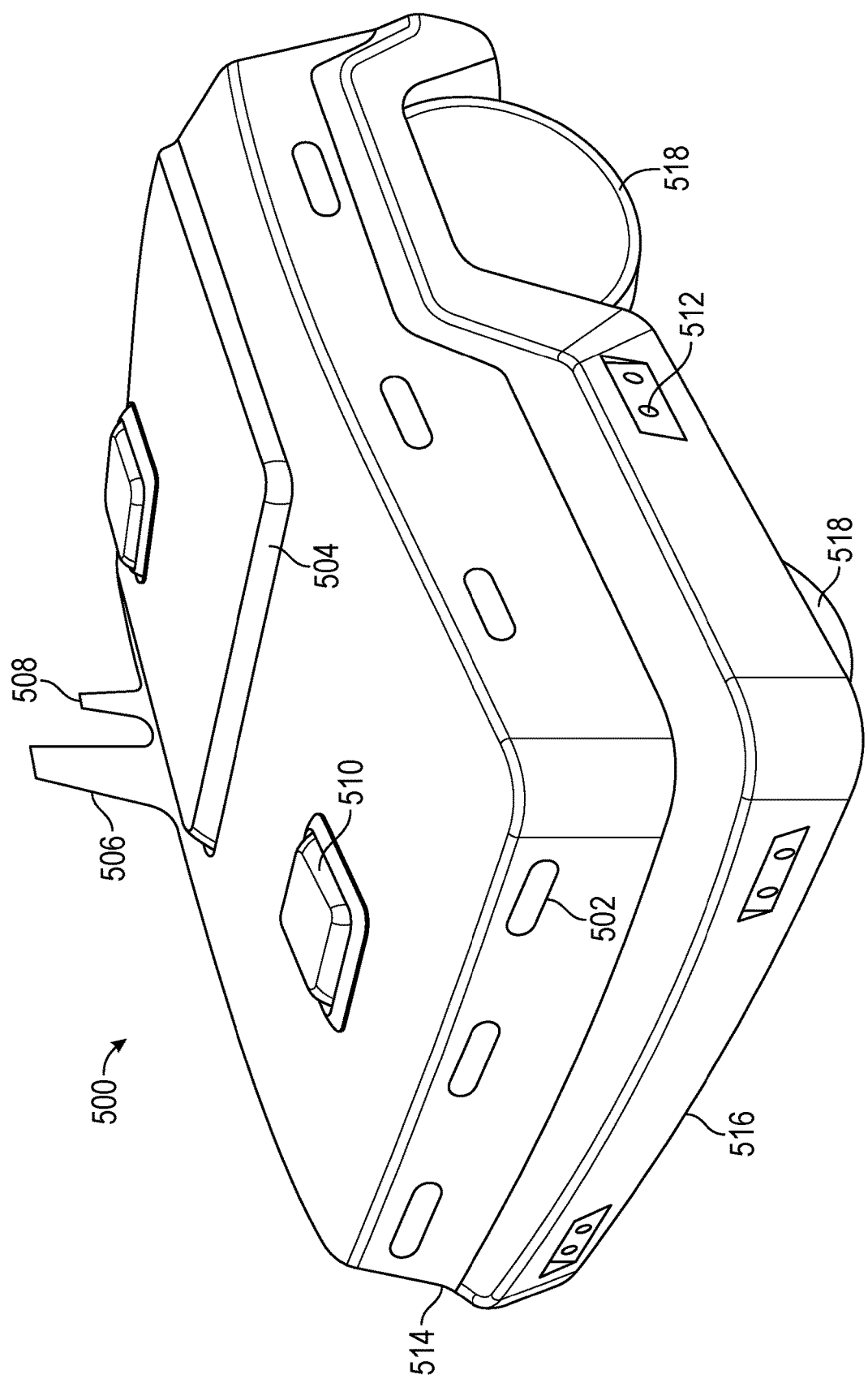
FIG. 5 is a front perspective view of a piece of power equipment that can be used in the system of FIG. 1, according to an exemplary embodiment.
Figure 6:
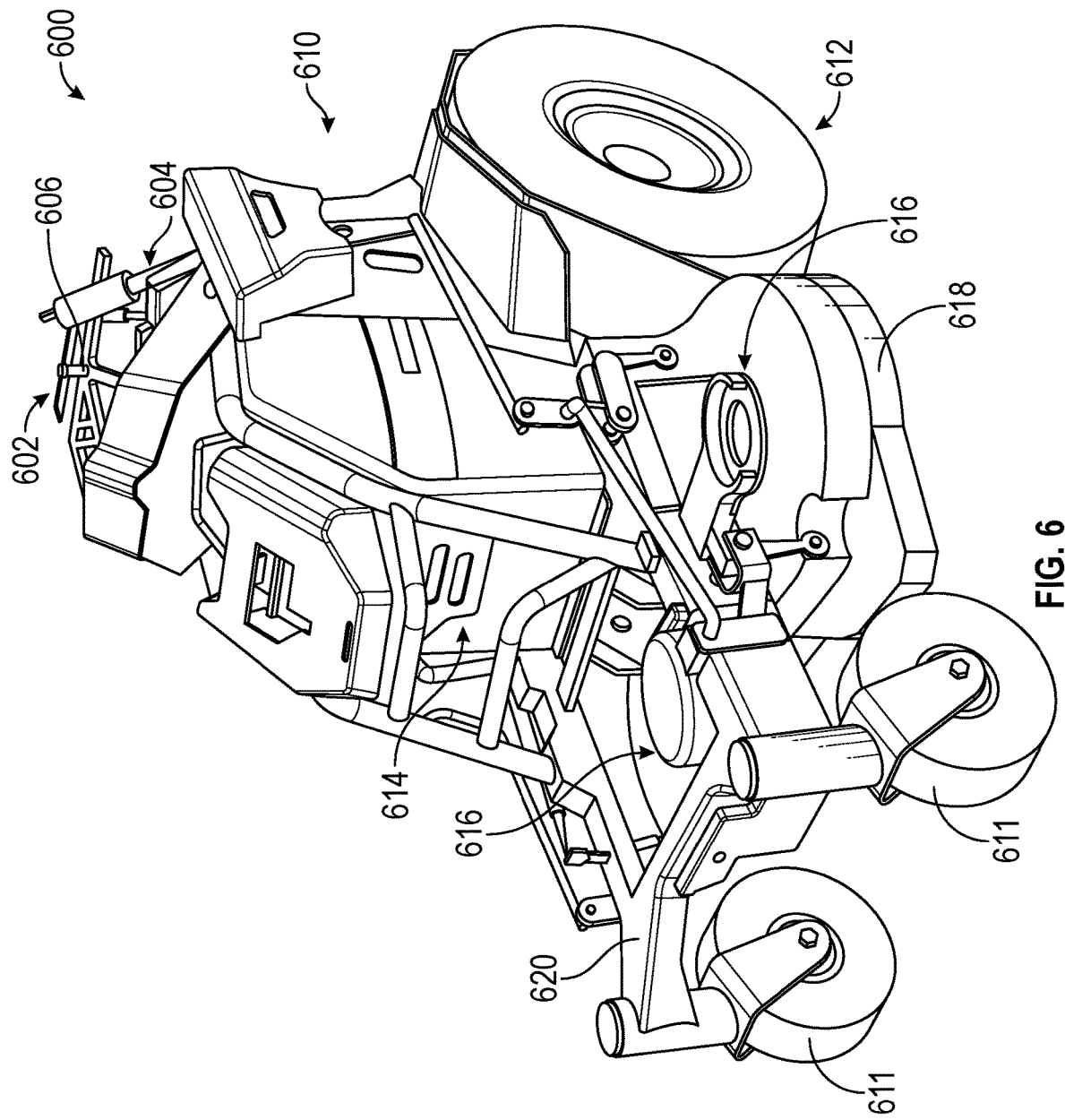
FIG. 6 is a front perspective view of another piece of power equipment that can be used in the system of FIG. 1, according to an exemplary embodiment.

Turning now to FIG. 5, an example of a power equipment 106 that may be transported and charged by the transportation vehicle 104 is shown, according to some embodiments. The autonomous lawn mower 500 is a type of power equipment 106 that may be utilized at a job site to complete a lawn care service. In some embodiments, the autonomous lawn mower 500 may be similar to the robotic lawnmower as described in commonly-owned PCT Publication No. WO2018/102338, entitled "Robotic Lawn Mower Including Removable Rechargeable Battery Module," the content of which is hereby incorporated by reference in its entirety. In some embodiments, the autonomous lawn mower 500 includes sensors 502, one or more removable batteries 504, a communications antenna 506, one or more locating antenna 508, a visual beacon 510, and one or more attachment points 512. In some embodiments, the autonomous lawn mower 500 uses a hybrid power solution, such as a combination of gas-engine power and battery power. In other embodiments, the autonomous lawn mower 500 is a purely electric system that runs on power from the battery 504. The autonomous lawn mower 500 may further include an upper frame 514, a lower frame 516, and wheels 518. While not shown in FIG. 5, the autonomous lawn mower 500 may also include operating lights, a user interface, one or more blades or other implements, and one or more electric motors to provide a traction drive and/or rotational drive power to the blades and/or other implements.

In one embodiment, the battery 504 is a removable battery pack. In some embodiments, the battery 504 may be a rechargeable battery, such as a Lithium-ion battery. However, other battery types, such as NiCd, lead-acid, Nickel-Metal Hydride (NiMH), or Lithium Polymer (LiPo), are also contemplated.

In some embodiments, the battery 504 is configured to be compact and light enough such that the battery 504 is easily portable by a user (e.g., a manager of power equipment 106). The battery 504 may be interchangeable between different pieces of equipment (e.g., between a lawn tractor, a vehicle, a walk-behind mower, a weed trimmer, a blower, a backup power supply, a stand-alone power supply, a portable generator, and a trolling motor). The sensors 502 on the autonomous lawn mower 500 may be positioned around the autonomous lawn mower 500 as shown, as well as in other locations as needed for a given configuration. The sensors 502 may be all of the same type, or may be a combination of different sensor types. Sensors may include object detection sensors, such as infrared (IR), LIDAR, RADAR, Time-of-Flight (ToF), CCD, CMOS, Ultrasonic, Sonar, or other sensors configured to detect objects. The visual sensors may be used to detect objects, to map a lawn, or to assist in guidance of the autonomous lawn mower 500. Further sensors may include moisture sensors, rain sensors, air quality sensors, magnetic field sensors (e.g. compass), temperature sensors, digital imaging sensors, motion detection sensors, rotation sensors, gyroscopes, chemical detection sensors, and so forth. In some embodiments, the sensors 502 are coupled to a controller 108 contained within the autonomous lawn mower 500, and used to provide data to the controller 108.

The communications antenna 506 may be configured to communicate with one or more other devices. In some embodiments, the communications antenna is configured to communicate using a wireless communication protocol, including but not limited to, Wi-Fi (e.g. 802.11x), Wi-Max, cellular (e.g. 3G, 4G, 5G, LTE, CDMA, etc.), LoRa, Zigbee, Zigbee Pro, Bluetooth, Bluetooth Low Energy (BLE), Near Field Communication (NFC), Z-Wave, 6LoWPAN, Thread, RFID, and other applicable wireless protocols. The communications antenna 506 may communicate with the network 102 to transmit information with respect to the operation of the autonomous lawn mower 500. In other embodiments, the communications antenna 506 may communicate with a local communications hub or bridge, such as a communications hub associated with a service vehicle. In still other embodiments, the communications antenna 506 may be configured to allow for the autonomous lawn mower 500 to communicate directly with a central or cloud-based server (e.g. via a cellular connection). In some embodiments, the communications antenna 506 communicates with the mobile device 114 capable of remotely controlling the autonomous lawn mower 500.

The locating antenna 508 may be configured to provide location data to the controller 108 of the autonomous lawn mower 500. In some embodiments, the locating antenna 508 may be a Global Positioning Satellite (GPS) antenna for receiving locations data from a number of GPS satellites. In other embodiments, the locating antenna 508 may be configured to receive one or more differential GPS signals for determining a location of the autonomous lawn mower 500. In still other embodiments, the locating antenna 508 may be configured to receive one or more inputs from a local positioning system. In still additional embodiments, the locating antenna 508 may relay data to other power equipment 106 (e.g., mower 600 (FIG. 6)), or supervisory controllers (e.g., controller 112) to allow for the position of the autonomous lawn mower 500 to be monitored. In some embodiments, the location data of the autonomous lawn mower 500 is transmitted via the communications antenna 506.

In some embodiments, the visual beacon 510 is configured to provide information to a user, such as flashing in one or more patterns to indicate one or more failure codes. The visual beacon 510 may provide an alert that there is a warning, such as low battery, over-tilt, or that it can no longer move as required. The visual beacon 510 can also be configured to provide an indication that the autonomous lawn mower 500 is operating. For example, the visual beacon 510 may illuminate a specific color or illumination pattern when the autonomous lawn mower 500 is actively operating (e.g. the implements are being powered).

In some embodiments, the attachment points 512 provide a power and ground connection (e.g., a connection to a charging device 110), as well as a communication connection to the controller 108 of the autonomous lawn mower 500. Additionally, the attachment points 512 may be used to attach one more implements, control modules, communication modules, and the like to the autonomous lawn mower 500. For example, work implements, such as edgers, string trimmers, torches, sprayers, chemical dispensers, snow blowers, power rakes, sod cutters, leaf blowers, leaf balers, paint/marking dispensers, etc., may be coupled to the attachment points 512.

FIG. 6 illustrates another example of a piece of power equipment 106, in the form of a stand-on electric mower 600, which includes one or more traction motors and one or motor chore motors 616 electrically coupled to and powered by the battery 614. The chore motors 616 are coupled to a rotary tool, such as a blade in the cutting deck 618 of the mower 600, an auger, a saw, tines, a drill, a pump, or other rotary tools. The mower 600 includes rear drive wheels 612 and front caster wheels 611. The rear drive wheels are each driven by a traction motor. In other embodiments, the mower 600 can include more or less wheels. An operator area 610 is positioned proximate the rear of the mower 600, where the operator faces toward the front of the mower 600 while in operation. The operator area 610 includes a platform on which the operator stands while operating the mower 600. The platform may include sensors to detect when the operator is positioned on the platform (e.g., to operate chore motors 616 of the mower 600, etc.).

The drive levers 604 are coupled to left and right traction motors which are coupled to (e.g., engage with) and control the rotation of the rear drive wheels 612. The rear drive wheels 612 rotate differently in response to various operator inputs at the drive levers 604. Accordingly, when the operator moves the drive levers 604 in a forward direction, the rear drive wheels 612 rotate in a forward direction to propel the mower 600 forward.

The mower 600 includes a dashboard 602 operable by the operator to control certain operating or performance conditions of the mower 600. The dashboard 602 includes a programmable user interface, which displays current operating conditions, maintenance notifications and/or warnings to the operator (e.g., the battery 614 has a low charge, the mower 600 needs to return to the transportation vehicle 104 to recharge, etc.). The dashboard 602 and user interface are positioned in view of the operator such that when the operator is standing on the platform, the operator can clearly see the dashboard 602 and user interface in his or her line of sight. Accordingly, the dashboard 602 and user interface are positioned near the center of the mower 600 proximate the drive levers 604 and handle 606. The user interface may include a touchscreen and/or selector interfaces (e.g., pushbuttons, toggles, etc.) which may receive input from the operator. Through interaction with the user interface, the operator inputs commands into a control system of the mower, which in turn, controls the mower 600 based on the operator input.

The dashboard 602 can include indicators (e.g., one or more LEDs) placed proximate the user interface which indicate, via color (e.g., red, yellow, green) a power draw for each of the batteries (e.g., the battery 614) of the mower 600. In some embodiments, the indicator shows the efficiency with which the operator is operating the mower 600. In some embodiments, if the systems described herein are used on outdoor power equipment which is a hybrid device, the equipment can indicate an amount of motor usage of the motors to the operator. The dashboard 602 can include one or more LEDs, a display screen, a steering wheel, a throttle control, one or more drive sticks, buttons (e.g., one or more buttons to enable a chore function (e.g., turn on lawn mower blades, turn off lawn mower blades, select blade speed, etc.), and/or any other input and/or output device. In some embodiments, the dashboard 602 may include a lockout input device, such as a switch, to transmit, via the user interface circuit 206 of controller 108, to the controller 112 that the power equipment 106 may not be recharged.

Figure 7:
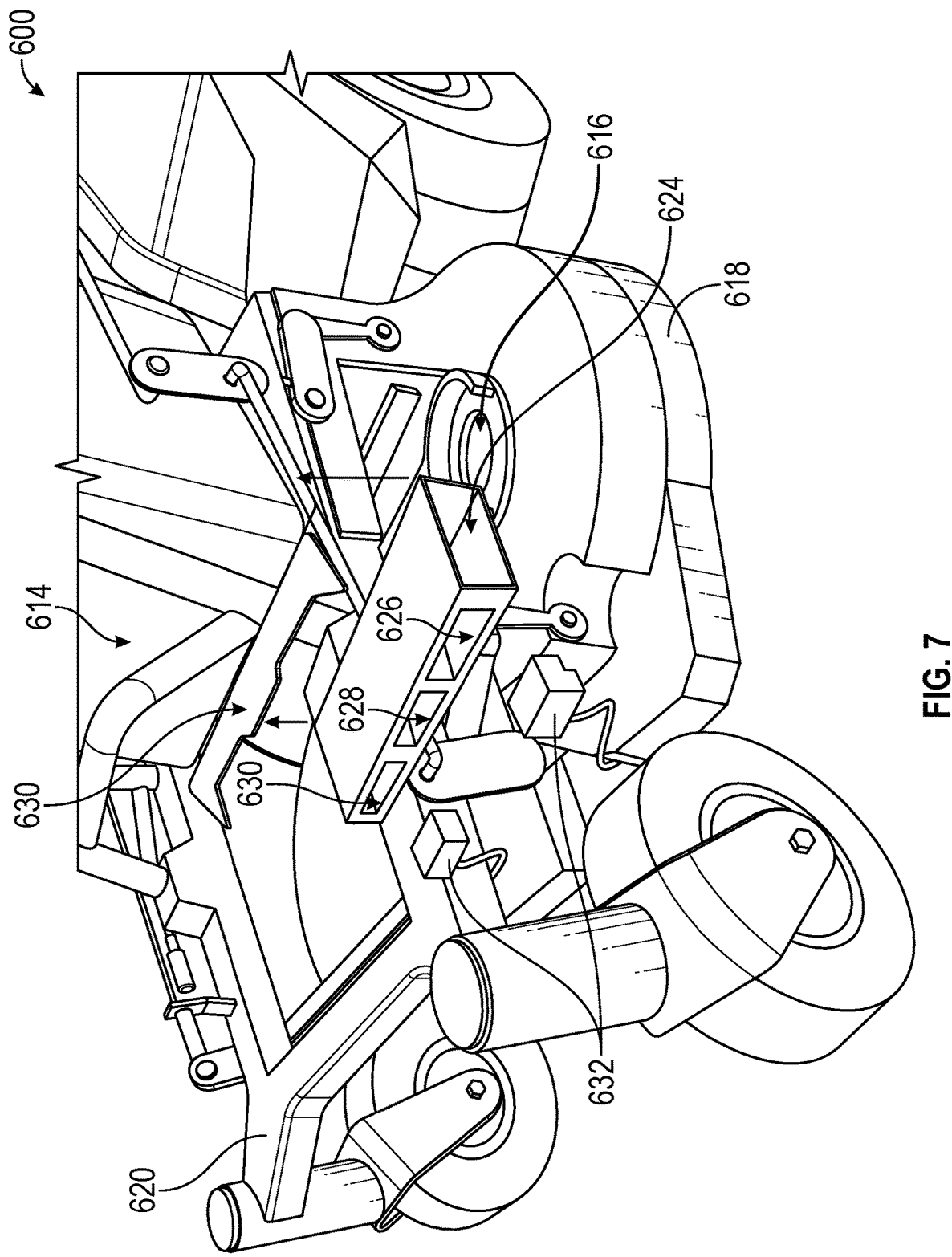
FIG. 7 is a perspective view of charging ports of the piece of power equipment of FIG. 6.

FIG. 7 depicts a front portion of the stand-on electric mower 600 and the position of a distribution box 624 with power ports to receive a connection from one or more charging devices 110, according to an exemplary embodiment. FIG. 7 is shown to include the portion of the frame 620, the battery 614, the chore motors 616 on separate sides of a cutting deck 618, the distribution box 624, and outlets 626, 628, and 630. The outlets 626, 628, and 630 may have connection interfaces with two 50A positive, cylindrical, power ports on one side of a data connection port. On the other side of the data connection port, the connection interfaces of the outlets 626, 628, and 630 may include two 50A negative, cylindrical, power ports. The distribution box 624 may couple to the underside of the portion of the frame 620 beneath and near the battery 614 to allow short connection lines between the distribution box 624 and the battery 614. The distribution box 624 may also be centered and near the cutting deck 618 in order to easily run connection lines (e.g., motor phase lines, communication lines, etc.) down to the chore motors 616 and any other implements. The distribution box male connectors 632 may couple to one of the outlets of the distribution box 624 and the cable from the distribution box male connectors 632 may then connect to the chore motors 616 via a female connector plugging into a male connector coupled to the chore motors 616. In some embodiments, the distribution box male connectors 632 include five pins on a plug to connect to each port of an outlet of the distribution box 624. In some embodiments, one or more charging devices 110 physically and electrically connect to the outlets of the distribution box 624 using a connection interface the same or similar as the distribution box male connectors 632. In some embodiments, the distribution box 624 has more or less outlets than shown in FIG. 7 and has covers for any outlets without a connection to a motor or an implement.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

The construction and arrangements of the present disclosure, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A transportation vehicle comprising:
   a trailer including:
      a battery pack;
      a plurality of power equipment;
      a controller, the controller configured to identify at least one of the plurality of power equipment or the battery pack that requires charging and direct power through a bus to distribute power to at least one of the plurality of power equipment or the battery pack; and
      a power outlet configured to receive a connection from a power source to recharge the battery pack or at least one of the plurality of power equipment, the power source being arranged remotely from the trailer;
      wherein the battery pack is configured to recharge the plurality of power equipment, and
      wherein the controller is further configured to:

determine a first battery level of charge of a first power equipment is lower than a second battery level of charge of a second power equipment and balance the first battery level of charge and the second battery level of charge by using a battery supply of the second power equipment to recharge a battery supply of the first power equipment.

2. The transportation vehicle of claim 1, wherein the power source is a utility power source.

3. The transportation vehicle of claim 1, wherein the power source is coupled to a DC to DC converter configured to step down a voltage from the power source to a voltage level appropriate for recharging the battery pack or at least one of the plurality of power equipment.

4. The transportation vehicle of claim 1, wherein a mobile device communicates directly with the controller over one or more frequencies to change an operation of the plurality of power equipment.

5. The transportation vehicle of claim 1, wherein a generator associated with the transportation vehicle is configured to recharge the battery pack.

6. The transportation vehicle of claim 1, wherein the controller is further configured to determine a duration of time for at least one of the plurality of power equipment to recharge or the battery pack.

7. The transportation vehicle of claim 1, wherein the transportation vehicle further comprises a plurality of power ports, wherein each of the plurality of power ports are electrically connected to a single power connection, wherein each of the plurality of power ports are configured to receive a connection to one of the plurality of power equipment or the battery pack, and wherein the single power connection is a charging system bus.

8. The transportation vehicle of claim 1, wherein the transportation vehicle further comprises one or more docking mechanisms, wherein the one or more docking mechanisms are configured to recharge the plurality of power equipment so that in response to one of the plurality of power equipment connecting to one of the one or more docking mechanisms, the one of the plurality of power equipment begins to charge.

9. A transportation and charging system for power equipment comprising:
a transportation vehicle;
one or more removable battery packs;
one or more pieces of power equipment;
a charging system including a battery pack, the battery pack configured to supply power to the one or more pieces of power equipment; and
a controller, the controller configured to identify at least one of the one or more pieces of power equipment that requires charging and direct power from the battery pack through a bus to distribute power to at least one of the one or more pieces of power equipment, and
wherein the controller is further configured to:
determine a first battery level of charge of a first power equipment is lower than a second battery level of charge of a second power equipment and
balance the first battery level of charge and the second battery level of charge by using a battery supply of the second power equipment to recharge a battery supply of the first power equipment.

10. The transportation and charging system of claim 9, wherein the transportation vehicle further comprises a power outlet to receive a connection from a power source to recharge at least one of the one or more pieces of power equipment or the one or more removable battery packs via the charging system, wherein the power source is arranged remotely from the transportation vehicle.

11. The transportation and charging system of claim 9, wherein the transportation vehicle further comprises one or more power ports, wherein each of the one or more power ports are electrically connected to a single power connection, wherein each of the one or more power ports are configured to receive a connection to one of the one or more pieces of power equipment, and wherein the single power connection is a charging system bus.

12. The transportation and charging system of claim 9, wherein the transportation vehicle further comprises one or more docking mechanisms, wherein the one or more docking mechanisms are configured to recharge one or more pieces of power equipment so that in response to one of the one or more pieces of power equipment connecting to one of the one or more docking mechanisms, the power equipment begins to charge.

13. A trailer comprising:
a charging system including a battery pack and a plurality of outputs configured to provide electrical power from the battery pack at at least two different voltage levels;
one or more pieces of power equipment; and
a controller,
wherein the plurality of outputs include a plurality of charging devices providing available wired connections to transmit power from the battery pack;
wherein the one or more pieces of power equipment are physically and electrically connected to the plurality of charging devices to receive power from the battery pack and
wherein controller is further configured to:
determine a first battery level of charge of a first power equipment is lower than a second battery level of charge of a second power equipment and
balance the first battery level of charge and the second battery level of charge by using a battery supply of the second power equipment to recharge a battery supply of the first power equipment.

14. The trailer of claim 13, wherein the trailer further comprises a power outlet to receive a connection from a power source to recharge the plurality of charging devices, wherein the power source is arranged remotely from the trailer.

15. The trailer of claim 14, wherein the controller is configured to identify at least one of the one or more pieces of power equipment that requires charging and direct power through a bus to distribute the power to at least one of the one or more pieces of power equipment.

16. The trailer of claim 13, wherein the trailer further comprises a plurality of power ports each associated with one of the plurality of outputs, wherein each of the plurality of power ports are electrically connected to a single power connection, wherein each of the plurality of power ports are configured to receive a connection to one of the one or more pieces of power equipment, and wherein the single power connection can be configured to supply electric power at the at least two different power levels.

17. The trailer of claim 13, wherein the trailer further comprises one or more loading/unloading ramps configured to allow the one or more pieces of power equipment to be loaded onto or unloaded from the trailer.

* * * * *